(12) United States Patent
Mcleod et al.

(10) Patent No.: US 8,008,632 B2
(45) Date of Patent: Aug. 30, 2011

(54) TWO-ZONE ION BEAM CARBON DEPOSITION

(75) Inventors: Paul Stephen Mcleod, Berkeley, CA (US); Kueir-Weei Chour, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 372 days.

(21) Appl. No.: 12/179,234

(22) Filed: Jul. 24, 2008

(65) Prior Publication Data

US 2010/0019168 A1    Jan. 28, 2010

(51) Int. Cl.
*H01J 27/00* (2006.01)
*H01T 23/00* (2006.01)

(52) U.S. Cl. ............. 250/423 F; 250/423 R; 118/723 R; 427/523

(58) Field of Classification Search ............... 250/423 R, 250/423 F; 427/128, 131, 457, 523, 525, 427/595; 118/723, 723 R, 723 CB; 204/157.63, 204/173, 192.11, 192.12, 280, 280.01, 280.02
See application file for complete search history.

(56) References Cited

U.S. PATENT DOCUMENTS

| | | | |
|---|---|---|---|
| 4,620,102 A * | 10/1986 | Watanabe et al. | 250/427 |
| 4,710,938 A * | 12/1987 | Fuke et al. | 372/33 |
| 5,910,220 A * | 6/1999 | Zuhr et al. | 118/723 FI |
| 5,973,447 A * | 10/1999 | Mahoney et al. | 313/359.1 |
| 6,182,604 B1 * | 2/2001 | Goeckner et al. | 204/298.02 |
| 6,203,862 B1 | 3/2001 | Bluck et al. | |
| 6,251,238 B1 * | 6/2001 | Kaufman et al. | 204/242 |
| 6,569,294 B1 | 5/2003 | Khazanov et al. | |
| 7,362,842 B2 * | 4/2008 | Leung | 250/423 R |
| 7,368,041 B2 * | 5/2008 | Krassnitzer | 204/192.12 |
| 7,608,151 B2 * | 10/2009 | Tudhope et al. | 118/715 |
| 2003/0146707 A1 * | 8/2003 | Goldberg et al. | 315/111.81 |
| 2004/0214437 A1 * | 10/2004 | Ramm | 438/689 |
| 2006/0049038 A1 * | 3/2006 | Griego et al. | 204/228.1 |
| 2006/0097185 A1 * | 5/2006 | Mack | 250/423 R |
| 2006/0225998 A1 * | 10/2006 | Song | 204/192.11 |
| 2006/0246323 A1 * | 11/2006 | Liu et al. | 204/192.2 |

FOREIGN PATENT DOCUMENTS

JP    358186139 A    * 10/1983

* cited by examiner

*Primary Examiner* — Robert Kim
*Assistant Examiner* — Brooke Purinton
(74) *Attorney, Agent, or Firm* — Foley & Lardner LLP

(57) ABSTRACT

The invention relates an ion source for ion beam deposition comprising multiple anodes, wherein the ion source deposits multiple zones of a source material and thicknesses of at least two of the multiple zones are different.

15 Claims, 2 Drawing Sheets

TWO-ZONE ION BEAM CARBON DEPOSITION

BACKGROUND

When depositing diamond-like carbon layers for wear protection it is advantageous to deposit two or more layers of carbon, each with different film thicknesses; the thicker layer on the laser texture zone and the thinner in the data zone. The thicker layer provides wear protection and the thinner one giving the advantage that the head can fly closer to the media and thereby provide better magnetic performance.

When depositing carbon by ion beam deposition, it is often not possible for space reasons or practical for cost reasons to utilize two or more ion sources as the number of process chambers is limited.

SUMMARY

The invention relates to an ion source for ion beam deposition comprising multiple anodes, wherein the ion source deposits multiple zones of a source material and thicknesses of at least two of the multiple zones are different.

Preferred embodiments of the invention are shown and described, by way of illustration of the best mode contemplated for carrying out the invention, in the following detailed description. As will be realized, this invention is capable of other and different embodiments, and its details are capable of modifications in various obvious respects, all without departing from the invention. Accordingly, the drawings and description are to be regarded as illustrative in nature and not as restrictive.

BRIEF DESCRIPTION OF THE DRAWINGS

The present invention will be better understood by reference to the Detailed Description when taken together with the attached drawings, wherein.

DETAILED DESCRIPTION

Figure 1:
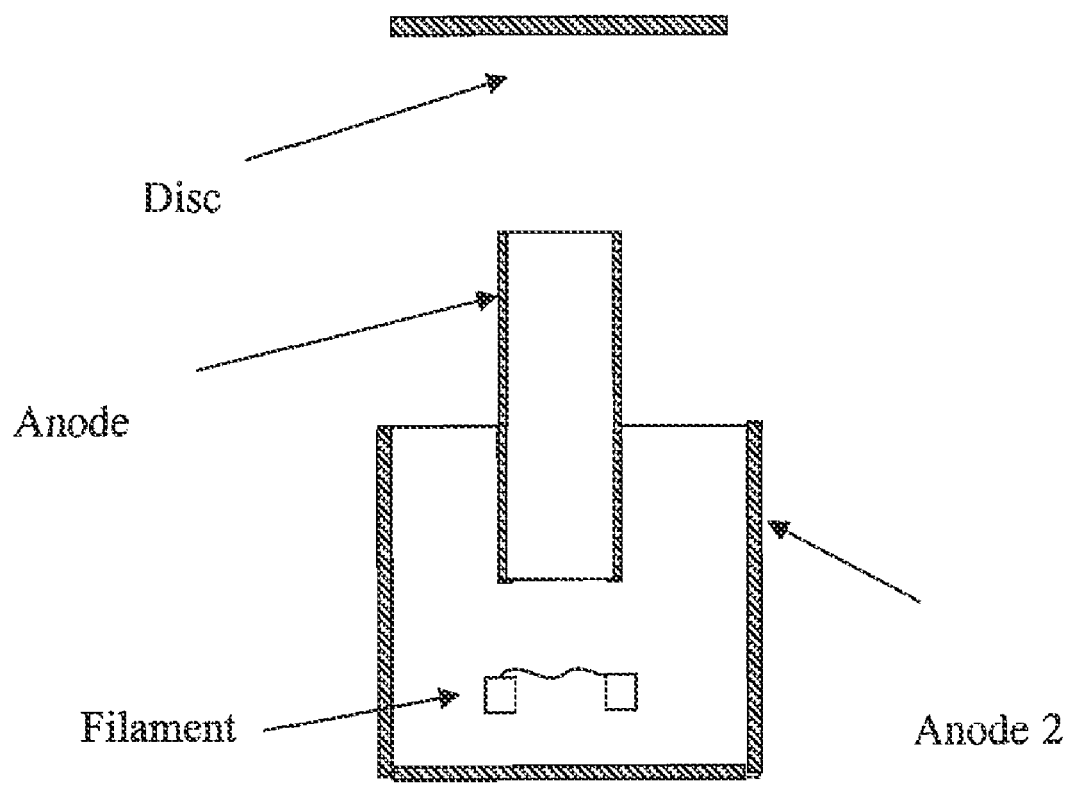
FIG. 1 schematically shows an ion beam deposition source comprising two concentric anode cylinders.
Figure 2:
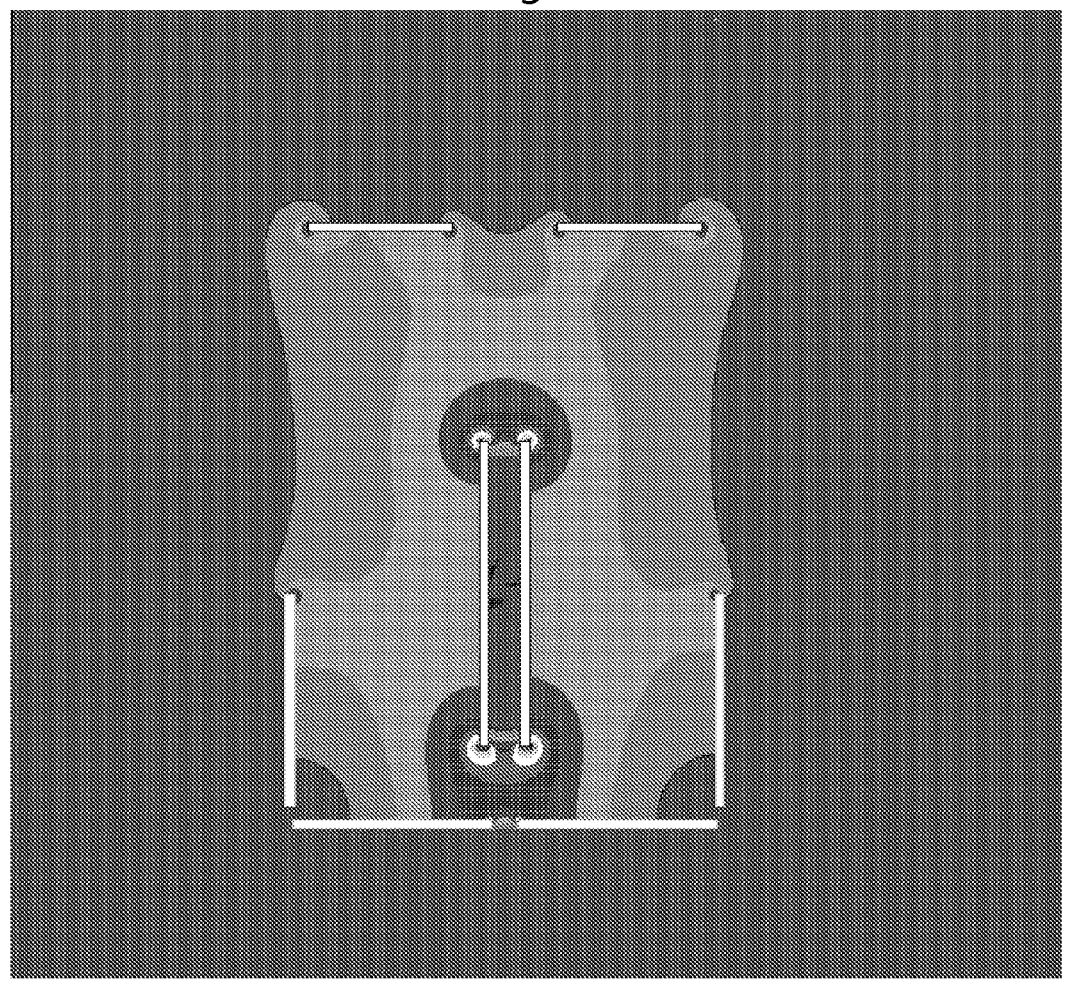
FIG. 2 depicts the electrostatic fields of an embodiment of the present invention in a grounded state.

A single ion beam source is utilized to deposit two concentric zones of diamond-like carbon layers, each with a different thickness, by adjusting the flux distribution of carbon ions arriving at the disc. This can be done by modifying the ion source to deliver a large portion of the ions to the inner laser texture zone and allowing a smaller fraction to deposit in the data zone. An ion source is modified to have two concentric anode cylinders. A separate positive voltage is applied to each cylinder and the thickness of the carbon layer is controlled by adjusting the voltage on each. A schematic is shown in FIG. 1.

One embodiment of the invention is an ion source for ion beam deposition comprising multiple anodes, wherein the ion source deposits multiple zones of a source material and thicknesses of at least two of the multiple zones are different. In one variation, the ion source comprises multiple concentric anodes. In another variation, the ion source comprises two concentric anodes. According to one implementation, different voltages are applied to the multiple anodes.

Another embodiment of the invention is a method of depositing multiple concentric zones of a source material on a substrate, wherein respective thicknesses of the concentric zones are different, the method comprising providing a substrate, providing an ion source comprising concentric anode cylinders, and adjusting voltages applied to the concentric anodes. In one variation, the ion source comprises two concentric anode cylinders.

According to one implementation, a thickness of a carbon layer is greater in a concentric zone closer to the center of the disc than in a concentric zone further from the center of the disc.

Another embodiment is a method of manufacturing a magnetic recording medium comprising obtaining a substrate, depositing at least one magnetic layer, and depositing a carbon-containing layer on the topmost magnetic layer, wherein the carbon-containing layer is deposited by ion beam deposition in multiple concentric zones having different respective thicknesses.

An additional embodiment of the invention is a recording medium comprising, from the bottom to the top:
(1) Substrate: polished glass, glass ceramics, or Al/NiP.
(2) Adhesion layers to ensure strong attachment of the functional layers to the substrates. One can have more than one layer for better adhesion or skip this layer if adhesion is fine. The examples include Ti alloys.
(3) Soft underlayers (SUL) include various design types, including a single SUL, anti-ferromagnetic coupled (AFC) structure, laminated SUL, SUL with pinned layer (also called anti-ferromagnetic exchange biased layer), and so on. The examples of SUL materials include $Fe_xCo_yB_z$ based, and $Co_xZr_yNb_z/Co_xZr_yTa_z$ based series.
(4) Seed layer(s) and interlayer(s) are the template for Co (00.2) growth. Examples are RuX series of materials.
(5) Oxide containing magnetic layers (M1) can be sputtered with conventional granular media targets reactively (with $O_x$) and/or non-reactively. Multiple layers can be employed to achieve desired film property and performance. Examples of targets are $Co_{100-x-y-z}Pt_x(MO)_y$ and/or $Co_{100-x-y-z}Pt_x(X)_y(MO)_z$ series (X is the $3^{rd}$ additives such as Cr, and M is metal elements such as Si, Ti and Nb). Besides oxides in M1, the list can be easily extended such that the magnetic grains in M1 can be isolated from each other with dielectric materials at grain boundary, such as nitrides ($M_xN_y$), carbon (C) and carbides ($M_xC_y$) The examples of sputter targets are $Co_{100-x-y-z}Pt_x(MN)_y$, $Co_{100-x-y}Pt_x(MC)_y$, and/or $Co_{100-x-y-z}Pt_x(X)_y(MN)_z$, $Co_{100-x-y-z}Pt_x(X)_y(MC)_z$ series.
(6) Non-oxide containing magnetic layers (M2): The sputter targets can be used including conventional longitudinal media alloys and/or alloy perpendicular media. Desired performance will be achieved without reactive sputtering. Single layer or multiple layers can be sputtered on the top of oxide containing magnetic layers. The non-oxide magnetic layer(s) will grow epitaxially from oxide granular layer underneath. The orientation could eventually change if these layers are too thick. The examples of these are $Co_{100-x-y-z-\alpha}Cr_xPt_yB_zX_\alpha Y_\beta$.
(7) Carbon cap layer as described above.

The above layered structure of an embodiment is an exemplary structure. In other embodiments, the layered structure could be different with either less or more layers than those stated above.

Instead of the optional NiP coating on the substrate, the layer on the substrate could be any Ni-containing layer such as a NiNb layer, a Cr/NiNb layer, or any other Ni-containing layer. Optionally, there could be an adhesion layer between the substrate and the Ni-containing layer. The surface of the Ni-containing layer could be optionally oxidized.

The substrates used can be Al alloy, glass, or glass-ceramic. The magnetically soft underlayers according to present invention are amorphous or nanocrystalline and can be FeCoB, FeCoC, FeCoTaZr, FeTaC, FeSi, CoZrNb, CoZrTa, etc. The seed layers and interlayer can be Cu, Ag, Au, Pt, Pd, Ru-alloy, etc. The CoPt-based magnetic recording layer can be CoPt, CoPtCr, CoPtCrTa, CoPtCrB, CoPtCrNb, CoPtTi, CoPtCrTi, CoPtCrSi, CoPtCrAl, CoPtCrZr, CoPtCrHf, CoPtCrW, CoPtCrC, CoPtCrMo, CoPtCrRu, etc., deposited under argon gas (e.g., M2), or under a gas mixture of argon and oxygen or nitrogen (e.g., M1). Dielectric materials such as oxides, carbides or nitrides can be incorporated into the target materials also.

Embodiments of this invention include the use of any of the various magnetic alloys containing Pt and Co, and other combinations of B, Cr, Co, Pt, Ni, Al, Si, Zr, Hf, W, C, Mo, Ru, Ta, Nb, O and N, in the magnetic recording layer.

In a preferred embodiment the total thickness of SUL could be 100 to 5000 Å, and more preferably 600 to 2000 Å. There could be a more than one soft under layer. The laminations of the SUL can have identical thickness or different thickness. The spacer layers between the laminations of SUL could be Ta, C, etc. with thickness between 1 and 50 Å. The thickness of the seed layer, $t_s$, could be in the range of $1 Å < t_s < 50 Å$. The thickness of an intermediate layer could be 10 to 500 Å, and more preferably 100 to 300 Å. The thickness of the magnetic recording layer is about 50 Å to about 300 Å, more preferably 80 to 150 Å. The adhesion enhancement layer could be Ti, TiCr, Cr etc. with thickness of 10 to 50 Å. The overcoat cap layer could be hydrogenated, nitrogenated, hybrid or other forms of carbon with thickness of 10 to 80 Å, and more preferably 20 to 60 Å.

The magnetic recording medium has a remanent coercivity of about 2000 to about 10,000 Oersted, and an $M_r t$ (product of remanance, Mr, and magnetic recording layer thickness, t) of about 0.2 to about 2.0 memu/cm$^2$. In a preferred embodiment, the coercivity is about 2500 to about 9000 Oersted, more preferably in the range of about 4000 to about 8000 Oersted, and most preferably in the range of about 4000 to about 7000 Oersted. In a preferred embodiment, the $M_r t$ is about 0.25 to about 1 memu/cm$^2$, more preferably in the range of about 0.4 to about 0.9 memu/cm$^2$.

Almost all the manufacturing of a disk media takes place in clean rooms where the amount of dust in the atmosphere is kept very low, and is strictly controlled and monitored. After one or more cleaning processes on a non-magnetic substrate, the substrate has an ultra-clean surface and is ready for the deposition of layers of magnetic media on the substrate. The apparatus for depositing all the layers needed for such media could be a static sputter system or a pass-by system, where all the layers except the lubricant are deposited sequentially inside a suitable vacuum environment.

Each of the layers constituting magnetic recording media of the present invention, except for a carbon overcoat and a lubricant topcoat layer, may be deposited or otherwise formed by any suitable physical vapor deposition technique (PVD), e.g., sputtering, or by a combination of PVD techniques, i.e., sputtering, vacuum evaporation, etc., with sputtering being preferred. The lubricant layer is typically provided as a topcoat by dipping of the medium into a bath containing a solution of the lubricant compound, followed by removal of excess liquid, as by wiping, or by a vapor lube deposition method in a vacuum environment.

Sputtering is perhaps the most important step in the whole process of creating recording media. There are two types of sputtering: pass-by sputtering and static sputtering. In pass-by sputtering, disks are passed inside a vacuum chamber, where they are deposited with the magnetic and non-magnetic materials that are deposited as one or more layers on the substrate when the disks are moving. Static sputtering uses smaller machines, and each disk is picked up and deposited individually when the disks are not moving. The layers on the disk of the embodiment of this invention were deposited by static sputtering in a sputter machine.

The sputtered layers are deposited in what are called bombs, which are loaded onto the sputtering machine. The bombs are vacuum chambers with targets on either side. The substrate is lifted into the bomb and is deposited with the sputtered material.

A layer of lube is preferably applied to the carbon surface as one of the topcoat layers on the disk.

Sputtering leads to some particulates formation on the post sputter disks. These particulates need to be removed to ensure that they do not lead to the scratching between the head and substrate. Once a layer of lube is applied, the substrates move to the buffing stage, where the substrate is polished while it preferentially spins around a spindle. The disk is wiped and a clean lube is evenly applied on the surface.

Subsequently, in some cases, the disk is prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the disk.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

The implementations described above and other implementations are within the scope of the following claims.

What is claimed is:

1. An ion source for ion beam deposition comprising:
a first cylindrical anode;
a second cylindrical anode, the first cylindrical anode being concentric with the second cylindrical anode;
an electron source positioned within at least one of the first cylindrical anode and the second cylindrical anode;
a first voltage source input configured to apply a first voltage from a first voltage source to the first cylindrical anode to deposit a first thickness of a source material in a first zone on a substrate; and
a second voltage source input configured to apply a second voltage from a second voltage source that is separate from the first voltage source to the second cylindrical anode to deposit a second thickness of the source material in a second zone on the substrate,
wherein the first voltage is different than the second voltage and the first thickness is different than the second thickness.

2. The ion source of claim 1, wherein a first edge of the first cylindrical anode is offset from a corresponding edge of the second cylindrical anode such that the first edge of the first cylindrical anode is configured to be positioned closer to the substrate than the corresponding edge of the second cylindrical anode during use.

3. The ion source of claim 1, wherein the first zone is closer to the center of the substrate than the second zone, wherein the first voltage applied to the first anode is greater than the second voltage applied to the second anode such that the first thickness of the source material deposited in the first zone of the substrate is greater than the second thickness of the source material deposited in the second zone.

4. The ion source of claim 1, wherein the source material is carbon.

5. A method of depositing multiple concentric zones of a source material on a substrate, wherein respective thicknesses of the concentric zones are different, the method comprising:
placing an ion source in front of the substrate, the ion source comprising a first cylindrical anode, a second cylindrical anode, and an electron source, the first cylindrical anode being concentric with the second cylindrical anode, wherein the electron source is positioned within at least one of the first cylindrical anode and a second cylindrical anode;
applying a first voltage from a first voltage source to the first cylindrical anode to deposit a first thickness of the source material in a first zone on the substrate; and
applying a second voltage from a second voltage source to the second cylindrical anode to deposit a second thickness of the source material in a second zone on the substrate, the second voltage source being separate from the first voltage source.

6. The method of claim 5, wherein the substrate comprises a magnetic recording medium disc.

7. The method of claim 6, wherein the source material is carbon.

8. The method of claim 7, wherein a thickness of a carbon layer is greater in a concentric zone closer to the center of the disc than in a concentric zone farther from the center of the disc.

9. A method of manufacturing a magnetic recording medium comprising:
placing an ion source in front of a substrate, the ion source comprising a first cylindrical anode, a second cylindrical anode, and an electron source, the first cylindrical anode being concentric with the second cylindrical anode, wherein the electron source is positioned within at least one of the first cylindrical anode and a second cylindrical anode;
depositing at least one magnetic layer on the substrate;
applying a first voltage from a first voltage source to the first cylindrical anode to deposit a first thickness of a carbon-containing layer in a first zone on the substrate; and
applying a second voltage from a second voltage source to the second cylindrical anode to deposit a second thickness of the carbon-containing layer in a second zone on the substrate, the second voltage source being separate from the first voltage source.

10. The method of claim 9, wherein the carbon-containing layer is deposited in two concentric zones.

11. The method of claim 9, wherein a thickness of the carbon-containing layer is greater in a concentric zone closer to the center of the disc than in a concentric zone farther from the center of the disc.

12. The method of claim 11, wherein the first zone is closer to the center of the substrate than the second zone, wherein the first voltage applied to the first cylindrical anode is greater than the second voltage applied to the second cylindrical anode such that the first thickness of the source material deposited in the first zone of the substrate is greater than the second thickness of the source material deposited in the second zone.

13. The method of claim 9, wherein a first edge of the first cylindrical anode is offset from a corresponding edge of the second cylindrical anode such that the first edge of the first cylindrical anode is configured to be positioned closer to the substrate than the corresponding edge of the second cylindrical anode during use.

14. The method of claim 9, wherein the substrate comprises a glass material.

15. The method of claim 9, wherein the at least one magnetic layer comprises at least one oxide containing magnetic layer and at least one non-oxide containing magnetic layer.

* * * * *